US010522028B2

(12) United States Patent
Cui et al.

(10) Patent No.: US 10,522,028 B2
(45) Date of Patent: Dec. 31, 2019

(54) METHOD, DEVICE AND STORAGE MEDIUM FOR SEEKING HELP AND SMART FOOTWEAR

(71) Applicant: BEIJING XIAOMI MOBILE SOFTWARE CO., LTD., Beijing (CN)

(72) Inventors: Qiqi Cui, Beijing (CN); Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/010,137

(22) Filed: Jun. 15, 2018

(65) Prior Publication Data

US 2018/0374334 A1  Dec. 27, 2018

(30) Foreign Application Priority Data

Jun. 27, 2017  (CN) .......................... 2017 1 0502533

(51) Int. Cl.
| | | |
|---|---|---|
| *G08B 23/00* | (2006.01) | |
| *G08B 25/01* | (2006.01) | |
| *A43B 3/00* | (2006.01) | |
| *G06F 3/16* | (2006.01) | |
| *G06F 3/01* | (2006.01) | |

(52) U.S. Cl.
CPC .......... *G08B 25/016* (2013.01); *A43B 3/0005* (2013.01); *G06F 3/017* (2013.01); *G06F 3/16* (2013.01); *G06F 3/167* (2013.01)

(58) Field of Classification Search
CPC ......... G08B 25/016; G06F 3/017; G06F 3/16; G06F 3/167; A43B 3/0005
See application file for complete search history.

(56) References Cited

U.S. PATENT DOCUMENTS

| | | | | |
|---|---|---|---|---|
| 3,777,086 A | | 12/1973 | Riedo | |
| 4,138,678 A | * | 2/1979 | Kirner | G01S 1/022 342/169 |
| 5,269,081 A | * | 12/1993 | Gray | A43B 7/00 36/136 |
| 5,471,405 A | * | 11/1995 | Marsh | A43B 3/0005 702/41 |
| 5,500,635 A | * | 3/1996 | Mott | A43B 1/0072 310/311 |

(Continued)

FOREIGN PATENT DOCUMENTS

| | | |
|---|---|---|
| CN | 204409732 U | 6/2015 |
| CN | 204791426 U | 11/2015 |

(Continued)

OTHER PUBLICATIONS

First Office Action issued in corresponding Chinese Application No. 201710502533.3, dated Dec. 3, 2018, 13 pages.

(Continued)

*Primary Examiner* — Quang Pham

(74) *Attorney, Agent, or Firm* — Arch & Lake LLP

(57) ABSTRACT

The present disclosure relates to a method, a device and a computer-readable storage medium for seeking help and a smart footwear. The method includes detecting a user operation with respect to the smart footwear, and executing a help seeking operation using the smart footwear when the user operation matches a predefined alarm operation.

10 Claims, 8 Drawing Sheets

(56) References Cited

U.S. PATENT DOCUMENTS

| | | | | |
|---|---|---|---|---|
| 6,430,843 B1* | 8/2002 | Potter | ................... | A43B 3/0005 36/28 |
| 7,376,565 B2* | 5/2008 | Gandhi | ................... | G08B 1/08 704/274 |
| 7,714,711 B1 | 5/2010 | Daniel | | |
| 7,724,132 B1 | 5/2010 | Daniel | | |
| 9,636,045 B2* | 5/2017 | Fleischer | ............... | A61B 5/6892 |
| 2005/0231353 A1* | 10/2005 | DiPoala | ............. | G08B 13/2494 340/522 |
| 2006/0103538 A1* | 5/2006 | Daniel | ................... | A43B 3/00 340/574 |
| 2006/0248750 A1* | 11/2006 | Rosenberg | ........... | A43B 1/0054 36/29 |
| 2007/0057798 A1* | 3/2007 | Li | ........................ | G08B 21/023 340/573.1 |
| 2008/0287832 A1* | 11/2008 | Collins | ................ | A43B 3/0005 600/587 |
| 2010/0200083 A1* | 8/2010 | Kouchi | ................... | G01F 1/363 137/486 |
| 2011/0054359 A1* | 3/2011 | Sazonov | .............. | A43B 3/0005 600/595 |
| 2011/0214501 A1* | 9/2011 | Ross | ..................... | A43B 3/0005 73/172 |
| 2013/0312288 A1* | 11/2013 | Colthurst | ............. | A43B 3/0042 36/103 |
| 2014/0123838 A1* | 5/2014 | D'Amours | .................. | G10H 1/32 84/626 |
| 2014/0135591 A1* | 5/2014 | Jung | ..................... | A61B 5/0015 600/301 |
| 2015/0106095 A1* | 4/2015 | Mitchell | ................. | G10L 25/51 704/236 |
| 2016/0093199 A1* | 3/2016 | Whitney | .............. | A43B 3/0005 340/539.13 |
| 2016/0299021 A1* | 10/2016 | Thillainadarajah | ....... | G01L 5/16 |
| 2017/0257934 A1* | 9/2017 | Garvey | ............. | H05B 37/0272 |
| 2017/0345422 A1* | 11/2017 | Yang | ....................... | G06F 3/167 |
| 2018/0232195 A1* | 8/2018 | Jaegal | ................. | G06F 3/04883 |

FOREIGN PATENT DOCUMENTS

| | | |
|---|---|---|
| CN | 105118228 A | 12/2015 |
| CN | 105698817 A | 6/2016 |
| CN | 106562508 A | 4/2017 |
| CN | 106686566 A | 5/2017 |
| CN | 206213381 U | 6/2017 |
| DE | 202010008949 U1 | 1/2011 |
| GB | 2352551 A | 1/2001 |
| JP | 2006255279 A | 9/2006 |

OTHER PUBLICATIONS

Partial European search report issued in corresponding European Application No. 18178815.9, dated Nov. 16, 2018, 15 pages.

European Extended Search Report issued in EP18178815.9, dated Mar. 27, 2019, 15 pages.

Second Office Action corresponding to Chinese Patent Application No. 201710502533.3 dated Jul. 17, 2019 and its English translation, (24p).

* cited by examiner

US 10,522,028 B2

METHOD, DEVICE AND STORAGE MEDIUM FOR SEEKING HELP AND SMART FOOTWEAR

CROSS-REFERENCE TO RELATED APPLICATION

This application is based on and claims priority to Chinese Patent Application No. CN201710502533.3, filed on Jun. 27, 2017, the entire content of which is incorporated herein by reference in its entirety for all purposes.

TECHNICAL FIELD

The present disclosure relates to the technical field of electronic device, and more particularly, to a method, a device and a storage medium for seeking help, and a smart footwear.

BACKGROUND

Electronic devices such as smart watches or smart phones are usually equipped with a help seeking device to protect the user's personal safety. The help seeking device may issue distress information when it determines that the user is in danger, thus the user's personal safety is protected. However, such the help seeking device requires manual user operations to start, and the problem arises when the user may be unable to start the help seeking device while he/she is in danger.

SUMMARY

The present disclosure discloses a method, a device and a non-transitory computer computer-readable storage medium for seeking help applied in a smart footwear.

According to a first aspect of the present disclosure, a method for seeking help is provided, the method is applied in a smart footwear and may include: detecting a user operation with respect to the smart footwear; and executing a help seeking operation using the smart footwear when the detected user operation matches a predefined alarm operation.

According to a second aspect of the present disclosure, a device for seeking help is provided, the device is applied in a smart footwear and may include: a processor; and a memory configured to store instructions executable by the processor, where the processor may be configured to: detect a user operation with respect to the smart footwear; and execute a help seeking operation using the smart footwear when the user operation matches a predefined alarm operation.

According to a third aspect of the present disclosure, a non-transitory computer-readable storage medium is provided, the computer-readable storage medium has stored thereon computer instructions that, when executed by a processor, cause the processor to implement: detecting a user operation with respect to a smart footwear; and executing a help seeking operation using the smart footwear when the detected user operation matches a predefined alarm operation.

It is to be understood that the above general description and the following detailed description are merely for the purpose of illustration and explanation, and are not intended to limit the scope of the protection of the disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Figure 1:
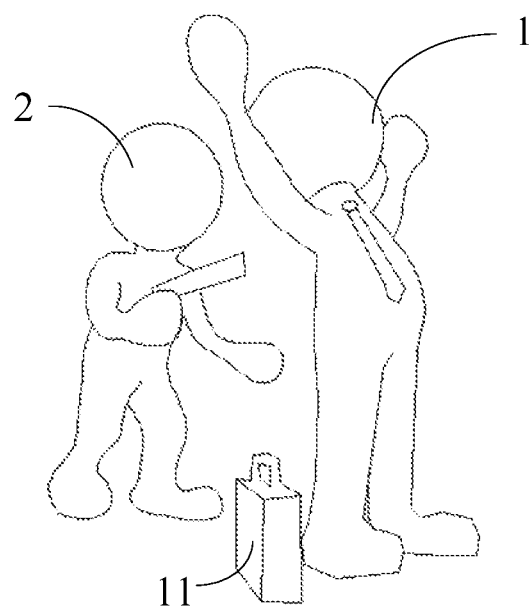
FIG. 1 is a application scenario diagram of a method for seeking help according to an example.

Hereinafter, examples will be described in detail, examples of which are shown in the drawings. In the following descriptions when referring to the drawings, the same numerals in the different drawings denote the same or similar elements unless otherwise indicated. The examples described in the following examples are not representative of all examples consistent with the present disclosure. Rather, they are merely examples of devices and methods consistent with some aspects of the present disclosure.

Terms used in the disclosure are only for description of particular examples, rather than intend to limit the disclosure. Singular form "a", "said" and "the" used in the disclosure and the appended claims also intend to include plural form, unless otherwise described distinctly in context. It is to be understood that the term "and/or" used in the disclosure refers to and includes any or all of possible combinations of one or more associated items listed.

It is to be understood that, although various information may be described using terms "first", "second", "third" and the like, the information is not limited to these terms. These terms are only used to distinguish the same kind of information from each other. For example, first information may be referred to as second information, and similarly, second information may be referred to as first information, without departing from the scope of the disclosure. For example, "if" as used herein, depending on the context, may be explained as "when . . . " or "in response to a determination that . . . ".

When people are in emergency or in danger, the spread of danger may be avoided to a certain extent and people's safety may be ensured if distress information can be sent out for help through smart watches, smart phones and other electronic devices. FIG. 1 is an application scenario diagram of a method for seeking help. As shown in FIG. 1, user 1 is robbed by criminal 2 on the way home at night. If user 1 wants to send out distress information at the moment, the first thing is to find his smart phone in the leather bag 11, and then call for help through the smart phone or send the distress information through other programs. However, due to the emergency situation, it will take a long time for user 1 to make a call or start a program; these operations are more likely to be found by criminal 2. Therefore, the user cannot timely and effectively send out the distress information, thereby endangering his safety.

In order to solve the above problems of lack of secrecy and timeliness when sending distress information in an emergency situation, the present disclosure provides a method and a device for seeking help, which are specifically described as follows.

Figure 2:
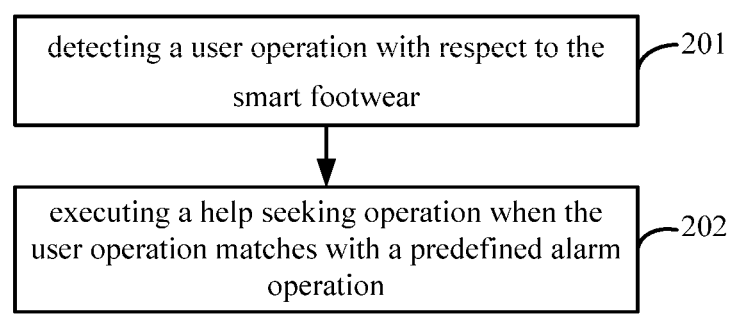
FIG. 2 is a flow diagram illustrating a method for seeking help according to an example.

FIG. 2 is a flow diagram illustrating a method for seeking help according to an example, and the method may be applied in a smart footwear. As shown in FIG. 2, the method may include the following steps.

In step 201, a user operation with respect to the smart footwear is detected.

In an example, the smart footwear may be an electronic device that is built to one or a pair of shoes that can be worn by a user. The smart footwear may receive an audio towards the smart footwear. In one case, the audio maybe acquired by a first audio reception submodule in the smart footwear. In another case, the smart footwear may further transmit an audio acquisition request to an electronic device associated with the smart footwear, such that the audio may be acquired by a second audio reception submodule in the electronic device, and then the smart footwear can receive the audio returned by the electronic device.

In another example, an action on the smart footwear may be detected. In one case, the smart footwear may acquire space attitude information that describes the action of the smart footwear. In another case, the smart footwear may also acquire pressure information that describes the action of the smart footwear. In this example, since the smart footwear is worn on a user's foot, the user operation with respect to the smart footwear can be completed by the user's foot, which is more secretive and convenient than the manual operation, and is helpful to send out the distress information effectively to protect the user's safety.

In step 202, a help seeking operation is executed when the user operation matches with a predefined alarm operation.

In this example, the user operation is determined to match with the predefined alarm operation when the audio or action matches with a predefined alarm audio or action. The smart footwear may include a plurality of predefined alarm operations for use by the user in different conditions. Specifically, the smart footwear may first determine the predefined alarm operation that matches with the user operation, then select the help seeking operation corresponding to the predefined alarm operation that matches with the user operation, and execute the selected help seeking operation. In the above example, the help seeking operation may include issuing an alarm or transmitting distress information to a predefined rescue object by the smart footwear or by an electronic device associated with the smart footwear.

In an example, in order to prevent the smart footwear from transmitting a wrong distress information due to a wrong determination, the help seeking operation may be executed when the user operation matches with the predefined alarm operation and the number of repeated executions of the user operation reaches a preset number of times. For example, the predefined alarm operation is foot stamping by the user. The user may inadvertently stamp his foot during a normal motion, but in fact there is no an alarm requirement. The above described method can avoid false alarms caused by a wrong determination and improve the practicability of the smart footwear.

The predefined rescue object may be devices near the smart footwear, a family member, a friend of the user or a police officer, which is not limited in the present disclosure. When the predefined rescue object is the devices in the vicinity of the smart footwear, a near field message may be transmitted to the nearby electronic devices via Bluetooth, ZigBee or the like, so that the nearby electronic devices can respond and rescue as soon as possible after receiving the near field message. In the above described method, due to the predefined rescue object in the vicinity of the user, the time for rescue arrival can be reduced and user's safety can be enhanced.

In the above examples, the distress information or the near field message may include location information, distress situation, audio information, video information, and picture information and the like, which is not limited in the present disclosure. The distress situation may contain the information about the situation the user encounters and the help the user needs and other information.

In summary, the above method for seeking help enables the smart footwear to transmit the distress information through an audio and action and the like with respect to the smart footwear, and the operation is quick and secret, which is favorable for the user to send out the distress information quickly and effectively under an emergency situation.

Figure 3:
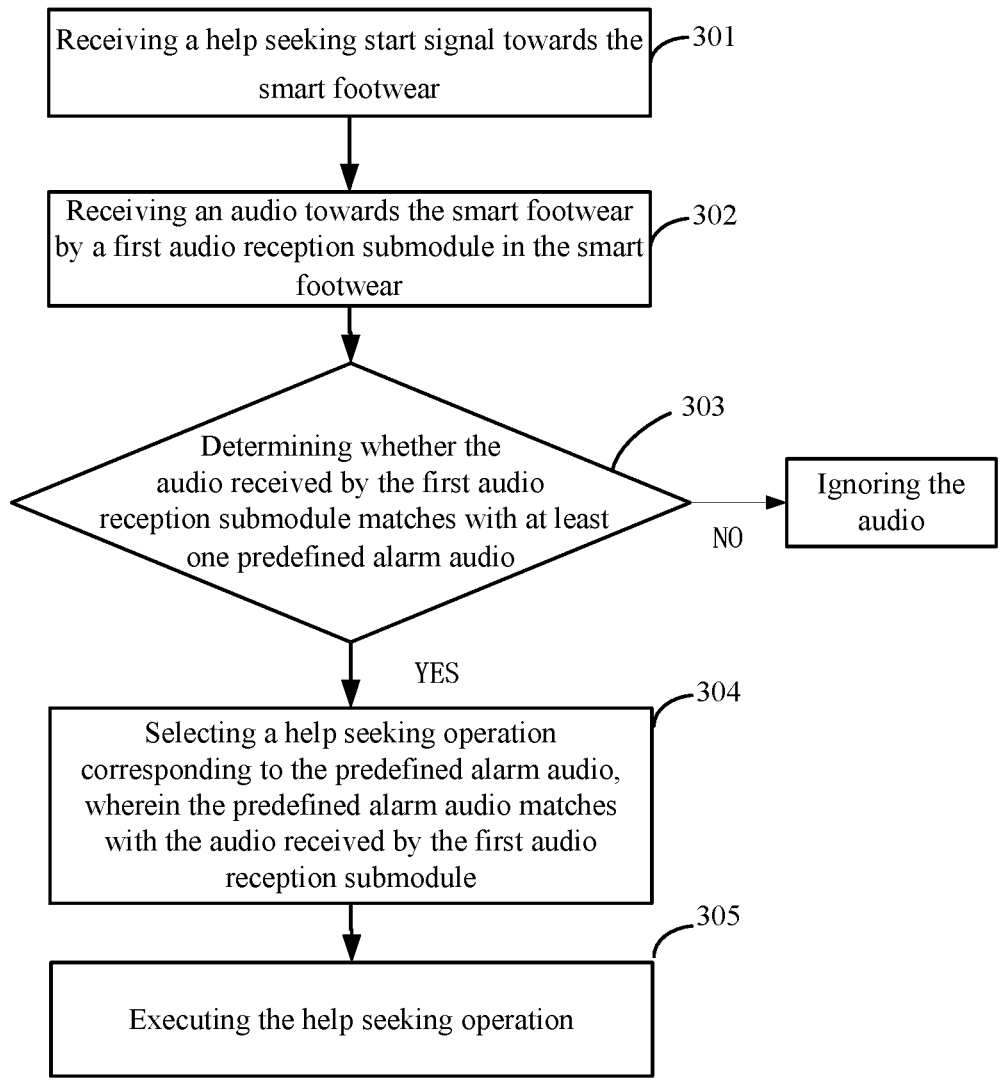
FIG. 3 is a flow diagram illustrating a method for seeking help according to another example.

FIG. 3 is a flow diagram illustrating a method for seeking help according to another example of the present disclosure, and the method is applied in a smart footwear. As shown in FIG. 3, the method may include the following steps.

In step 301, a help seeking start signal towards the smart footwear is received.

The user can send a simple signal to the smart footwear to start the device for seeking help in the smart footwear. For example, the audio reception submodule in the smart footwear may be started by foot stamping.

In step 302, an audio towards the smart footwear is received by a first audio reception submodule in the smart footwear.

For example, after the user making an audio instruction of "calling the police" after foot stamping, the first audio reception submodule receives the audio instruction of "calling the police".

In step 303, whether the audio received by the first audio reception submodule matches with at least one predefined alarm audio is determined. When the audio received by the first audio reception submodule matches with at least one predefined alarm audio, step 304 is performed; and when the audio does not match with the predefined alarm audio, the audio is ignored.

In step 304, a help seeking operation corresponding to the predefined alarm audio is selected, wherein the predefined alarm audio matches with the audio received by the first audio reception submodule.

In step 305, the help seeking operation is executed.

In this example, the smart footwear may include one or more predefined alarm audios, the plurality of predefined alarm audios may be used by the user in different situations, and each of the predefined alarm audios may include a corresponding help seeking operation. For example, the predefined alarm audios may include calling the police, seeking help from friend A and seeking help from family member B, and the like.

Each predefined alarm audio may have a corresponding help seeking operation. in the situation of foot sprained, after the user making an audio of "seeking help from family member B", matching the audio with the predefined alarm audio "seeking help from family member B", and the help seeking operation corresponding to the predefined alarm audio "seeking help from family member B" is to transmit the distress information to family member B though the smart footwear.

In an example, the help seeking operation corresponding to the predefined alarm audio may be to transmit the distress information to the predefined rescue object or directly issuing an alarm by the smart footwear. Transmitting the distress information to the predefined rescue object or directly issuing an alarm by the smart footwear can reduce the processes of information interaction, shorten the time for sending out the distress information or alarms, and avoid help seeking failure due to disconnection with electronic devices.

In another example, the help seeking operation corresponding to the predefined alarm audio may be to transmit an alarm signal to an electronic device associated with the smart footwear, such that the electronic device transmits the distress information to the predefined rescue object or directly issues an alarm. Transmitting the distress information to a predefined distress object or issuing an alarm by the electronic device associated with the smart footwear can reduce the technical difficulty of the help seeking device and also make the transmitting mode and content of the distress information more specific by utilizing the functions of the existing electronic device. For example, when transmitting the distress information through a smart phone associated with the smart footwear, audio and video information of the emergency scene may be sent to a preset friend in the cell phone address book or a police officer or may be dialing "911" by using audio recording and video recording functions of the phone, so as to facilitate the implementation of rescuers.

In another example, in order to avoid the rescue object misunderstanding or ignoring the distress information, the help seeking operation corresponding to the predefined alarm audio may be to transmit the distress information continuously until the rescue object responding to the distress information, and returning an acknowledgment signal. In another example, in order to prevent the smart footwear from transmitting a wrong distress information due to a wrong determination, the help seeking operation may be executed when the user operation matches with the predefined alarm operation and the number of repeated executions of the user operation reaches a preset number of times. For example, if the predefined alarm audio is "seeking help from family member B", the help seeking operation is executed when the smart footwear detected the audio "seeking help from family member B" for two times in the case of user seeking help.

In the above examples, the predefined rescue object may be a family member, a friend of the user or a police officer or a public safety helping line such as '911', which is not limited in the present disclosure. The distress information may include: location information, distress situation, audio information, video information, and picture information, which are not limited in the present disclosure. The distress situation may contain the information about the situation the user encounters and the help the user needs and other information.

Figure 4:
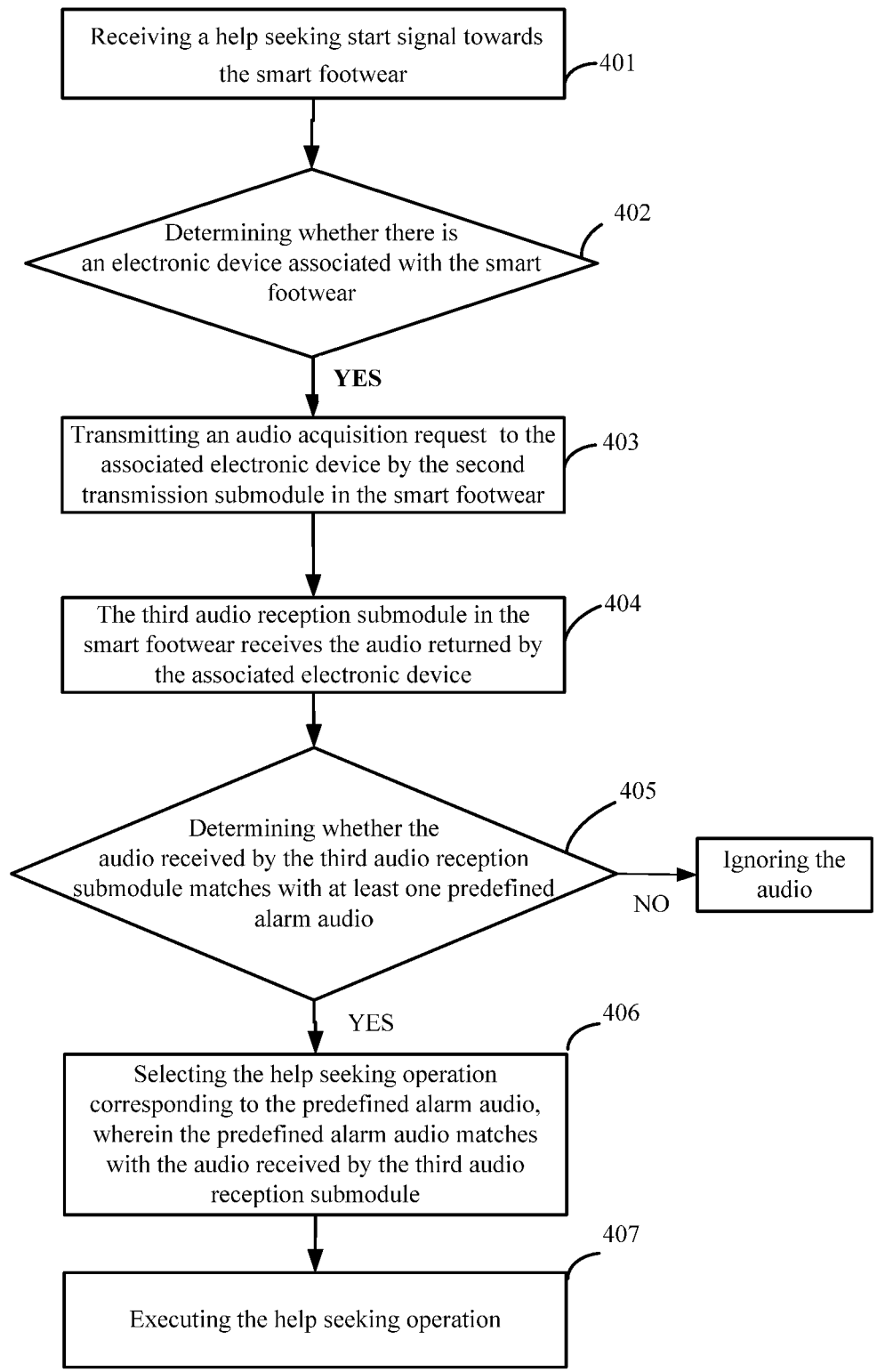
FIG. 4 is a flow diagram illustrating a method for seeking help according to another example.

In order to improve the degree of intelligence of the method for seeking help in the present disclosure, a method for acquiring a help seeking signal assisted by an electronic device associated with a smart footwear is further provided. The method is applied in a smart footwear. As shown in FIG. 4, the method includes the following steps.

In step 401, a help seeking start signal towards the smart footwear is received.

The user can send a simple signal to the smart footwear to start the device for seeking help in the smart footwear. For example, a second transmission submodule in the smart footwear may be started by foot stamping.

In step 402, whether there is an electronic device associated with the smart footwear is determined, and if yes, step 403 is performed.

The smart footwear can be determined to be associated with the electronic device when their distance is within 10 meters (the specific distance value can be preset as required) by obtaining the GPS location information of the smart footwear and the electrical device. Alternatively, the smart footwear is associated with the electronic device via Bluetooth. Or, in the case that the smart footwear and the electronic device are connected to the same WIFI, the smart footwear can be determined to be associated with the electronic device.

In the above example, the operations of steps 302-305 may be performed if there is no electronic device associated with the smart footwear.

In step 403, an audio acquisition request is transmitted to the associated electronic device by the second transmission submodule in the smart footwear.

For example, the second transmission submodule is started after user stamping feet, and it transmits an audio acquisition instruction to the associated electronic device, such that the electronic device acquires the audio.

In step 404, a third audio reception submodule in the smart footwear receives the audio returned by the associated electronic device.

When the audio is acquired by the electronic device associated with the smart footwear, the audio is acquired by a second audio reception submodule in the associated electronic device, which can simplify the structure of the help seeking device in the smart footwear, increase product stability and reduce costs.

In step 405, whether the audio received by the third audio reception submodule matches with at least one predefined alarm audio is determined. When the audio received by the third audio reception submodule matches with at least one predefined alarm audio, step 406 is performed; and when the audio does not match with the predefined alarm audio, the audio is ignored.

In step 406, a help seeking operation corresponding to the predefined alarm audio is selected, wherein the predefined alarm audio matches with the audio received by the third audio reception submodule.

In step 407, the help seeking operation is executed.

In this example, the help seeking operation corresponding to the predefined alarm audio is the same as the help seeking operation involved in the example shown in FIG. 3, which will not be repeated herein.

In the above example, the predefined rescue object may be a family member, a friend of the user or a police officer, which is not limited in the present disclosure. The distress information may include: location information, distress situation, audio information, video information, and picture information and the like, which are not limited in the present disclosure. The distress situation may contain the information about the situation the user encounters and the help the user needs and other information.

Figure 5:
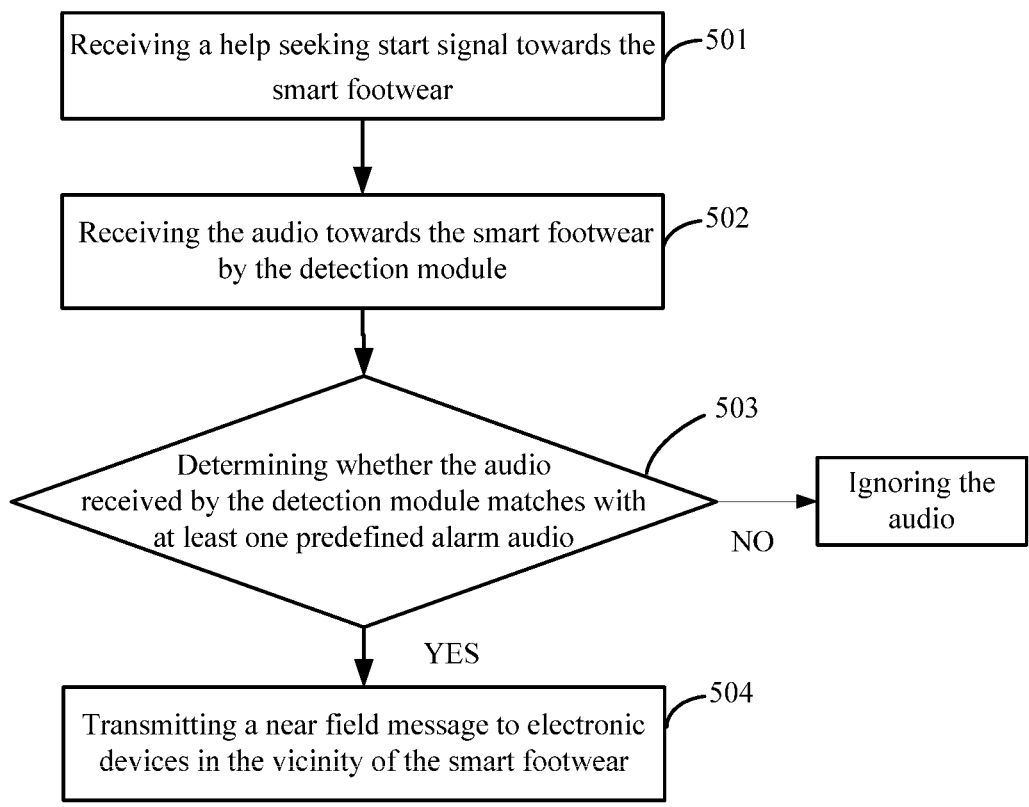
FIG. 5 is a flow diagram illustrating a method for seeking help according to another example.

In order to shorten the rescue time and improve the rescue efficiency, the present disclosure further provides a method for seeking help, which is applied in a smart footwear. As shown in FIG. 5, the method may include the following steps.

In step 501, a help seeking start signal towards the smart footwear is received.

The user can send a simple signal to the smart footwear to start the device for seeking help in the smart footwear. For example, the device for seeking help in the smart footwear may be started by foot stamping.

In step 502, an audio towards the smart footwear is received.

The audio may be acquired by the first audio reception submodule in the smart footwear in step 302 or may be acquired by the electronic device associated with the smart footwear in step 402, which is not limited in the present disclosure. For example, after the user making an audio instruction of "calling the police" after foot stamping, the smart footwear receives the audio instruction of "calling the police".

In step 503, whether the received audio matches with at least one predefined alarm audio is determined. When the received audio module matches with at least one predefined alarm audio, step 504 is performed; and when the audio does not match with the predefined alarm audio, the audio is ignored.

In step 504, a near field message is transmitted to electronic devices in the vicinity of the smart footwear.

In the above described method, because the predefined rescue object is the devices in the vicinity of the smart footwear, the near field message may be transmitted to the nearby electronic devices via Bluetooth, ZigBee or the like, so that the nearby electronic devices can respond and rescue as soon as possible after receiving the near field message, which can reduce the time for rescue arrival and enhance user's safety. The near field message may include location information, distress situation, audio information, video information, and picture information and the like, which is not limited in the present disclosure. The distress situation may contain the information about the situation the user encounters and the help the user needs and other information.

Figure 6:
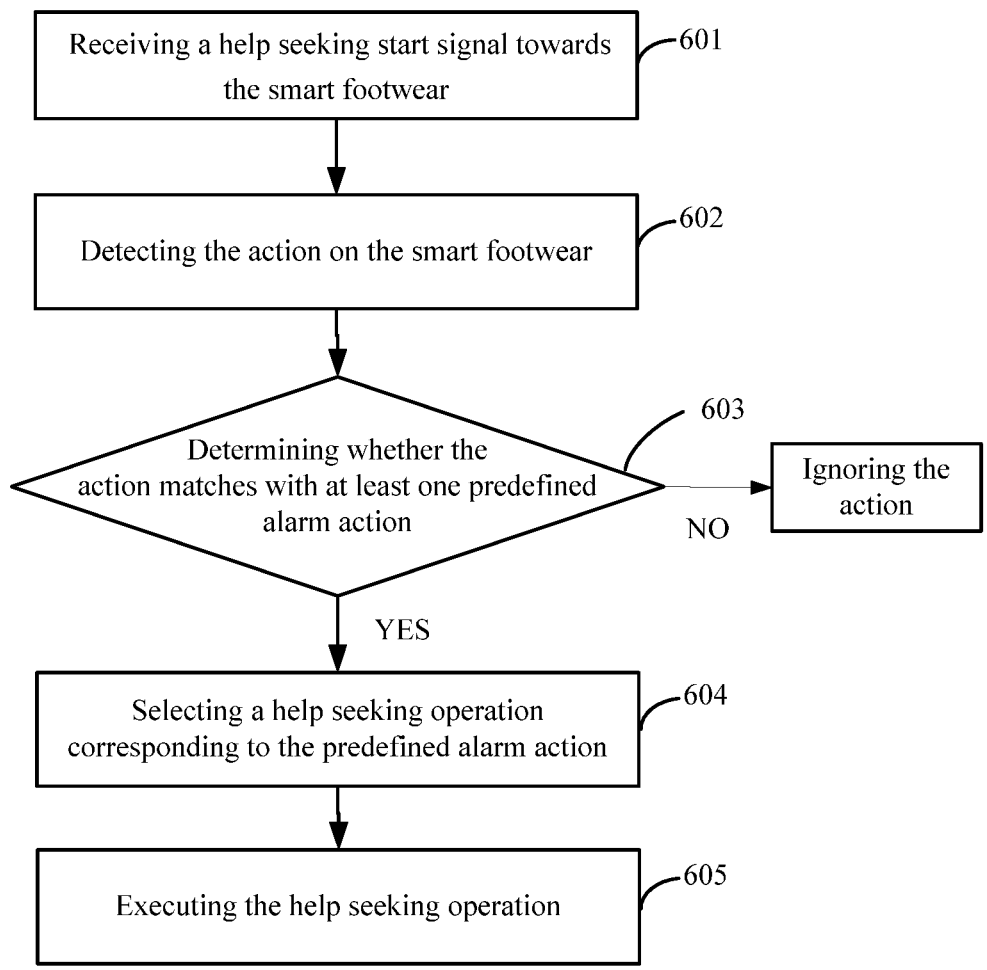
FIG. 6 is a flow diagram illustrating a method for seeking help according to another example.

In order to increase the timeliness and secrecy of seeking help, the present disclosure further provides a method for seeking help, which is applied in a smart footwear. As shown in FIG. 6, the method may include the following steps.

In step 601, a help seeking start signal towards the smart footwear is received.

The user can send a simple signal to the smart footwear to start the device for seeking help in the smart footwear. For example, an action detection submodule in the smart footwear may be started by foot stamping.

In step 602, an action on the smart footwear is detected.

In this example, space attitude information describing the action of the smart footwear may be acquired, and pressure information describing the action of the smart footwear may also be acquired. The space attitude information may include a planar path and a space attitude change drawn for the smart footwear, which is not limited in the present disclosure. The pressure information may include the pressure values on the smart footwear or the number of sudden changes in the pressure values, which is not limited in the present disclosure.

In step 603, whether the action matches with at least one predefined alarm action is determined. When the action matches with at least one predefined alarm action, step 604 is performed; and when the action does not match with the predefined alarm action, the action is ignored.

In step 604, a help seeking operation corresponding to the predefined alarm action is selected, wherein the predefined alarm action matches with the action detected on the smart footwear.

In step 605, the help seeking operation is executed.

In this example, the smart footwear may include a plurality of predefined alarm actions for use by the user in different situations. For example, the predefined alarm actions include: drawing a triangular path with feet, stamping feet, etc. Each predefined alarm action has a corresponding operation for sending distress information. In the case of robbery by criminals, when the user draws a triangle path with a foot and the triangle path matches with the predefined triangle path, a corresponding operation of calling the police is performed.

In the above examples, the help seeking operation corresponding to the predefined alarm action is the same as the help seeking operation involved in the example shown in FIG. 3, which will not be repeated herein. In the above example, the predefined rescue object may be a family member, a friend of the user or a police officer, which is not limited in the present disclosure. The distress information may include: location information, distress situation, audio information, video information, and picture information, which are not limited in the present disclosure. The distress situation may contain the information about the situation the user encounters and the help the user needs and other information.

In an example, the method of acquiring audios in the example shown in FIG. 5 may be replaced by detecting actions, which can also shorten the rescue time and improve the rescue efficiency.

Figure 7:
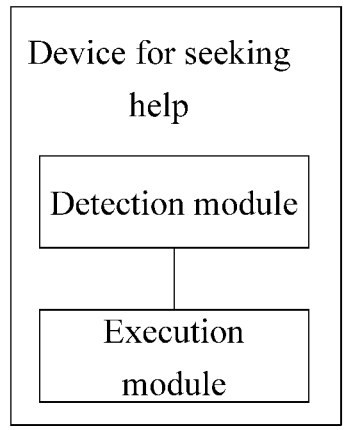
FIG. 7 is a structure diagram illustrating a device for seeking help according to an example.

FIG. 7 is a block diagram of a device for seeking help according to an example of the present disclosure. As shown in FIG. 7, the device for seeking help may include a detection module and an execution module, wherein the detection module is configured to detect a user operation with respect to the smart footwear and the execution module is configured to execute a help seeking operation when the user operation matches with a predefined alarm operation.

In an example, the detection module may comprise a first audio reception submodule configured to receive audio towards the smart footwear; and/or a second transmission submodule and a third audio reception submodule, wherein the second transmission submodule is configured to transmit an audio acquisition request to an electronic device associated with the smart footwear, and the third audio reception submodule is configured to receive the audio returned by the electronic device.

In another example, the detection module may comprise an action acquisition submodule configured to detect an action on the smart footwear. The action acquisition submodule may comprise a space attitude information acquisition submodule, configured to acquire space attitude information of the smart footwear. Alternatively, the action acquisition submodule may comprise a pressure information acquisition submodule, configured to acquire pressure information of the smart footwear. The space attitude information may include a planar path and a space attitude change drawn for the smart footwear, which is not limited in the present disclosure. The pressure information may include the pressure values on the smart footwear or the number of sudden changes in the pressure values, which is not limited in the present disclosure.

In an example, the execution module may include a first determination submodule and a selection submodule. The smart footwear may include a plurality of predefined alarm operations for use by users in different situations. The first determination submodule is configured to determine the predefined alarm operation that matches with the user operation and the selection submodule is configured to select the help seeking operation corresponding to the predefined alarm operation that matches with the user operation, and execute the selected help seeking operation.

In an example, the execution module may include a first transmission submodule configured to issue an alarm or transmit distress information to a predefined rescue object by the smart footwear, or transmit the distress information to an electronic device associated with the smart footwear, such that the electronic device issue an alarm or transmit the distress information to a predefined rescue object. In addition, the execution module may further include a second determination submodule configured to determine that the predefined rescue object receives the distress information successfully when the first transmission submodule continuously transmits the distress information.

In another example, the execution module may further include a broadcasting submodule configured to transmit a near field message to vicinity of the smart footwear via Bluetooth, ZigBee or the like; wherein the predefined rescue object comprises devices in the vicinity of the smart footwear. In this case, due to the predefined rescue object in the vicinity of the user, the time for rescue arrival can be reduced and user's safety can be enhanced.

In another example, in order to prevent the smart footwear from transmitting a wrong distress information due to a wrong determination, the execution module may include a counter submodule configured to count the number of repeated executions of the user operation when the user operation matches with the predefined alarm operation, so as to execute the help seeking operation when the number of repeated executions of the user operation reaches a preset number of times.

In the above examples, the predefined rescue object may be a family member, a friend of the user or a police officer, which is not limited in the present disclosure. The distress information may include: location information, distress situation, audio information, video information, and picture information and the like, which are not limited in the present disclosure. The distress situation may contain the information about the situation the user encounters and the help the user needs and other information.

Figure 8:
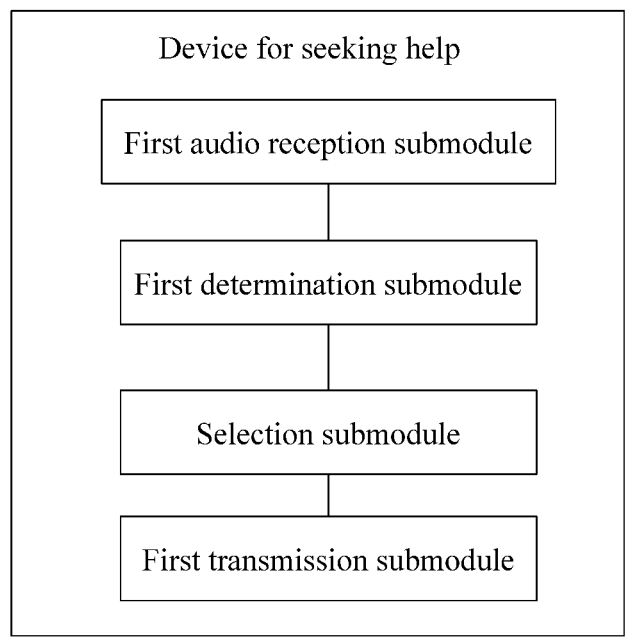
FIG. 8 is a structure diagram illustrating a device for seeking help according to another example.

FIG. 8 is a block diagram of a device for seeking help according to an example of the present disclosure. As shown in FIG. 8, the device for seeking help may include a first audio reception submodule, a first determination submodule, a selection submodule, and a first transmission submodule. The first audio reception submodule is configured to receive audio towards the smart footwear.

The smart footwear may contain multiple predefined alarm audios for use by the user in different situations. The first determination submodule is configured to determine whether the audio received by the first audio reception submodule matches with at least one predefined alarm audio. The audio is ignored when it does not match with a predefined alarm audio, and the function of the selection submodule is performed when the audio received by the first audio reception submodule matches with at least one predefined alarm audio.

The selection submodule is configured to select a help seeking operation corresponding to the predefined alarm audio that matches the audio.

The first transmission submodule is configured to execute the selected help seeking operation. Specifically, in an example, the first transmission submodule is configured to issue an alarm, and transmit distress information to a predefined rescue object. In another example, the first transmission submodule is configured to send an alarm signal to an electronic device associated therewith, so that the electronic device can issue an alarm or transmits the distress information to a predefined rescue object.

In order to avoid the rescue object misunderstanding or ignoring the distress information, the device for seeking help may include a second determination submodule, to determine that the predefined rescue object receives the distress information successfully when the first transmission submodule continuously transmits the distress information. In another example, in order to prevent the smart footwear from transmitting a wrong distress information due to a wrong determination, the device for seeking help may include a counter submodule to count the number of repeated executions of the user operation when the user operation matches with the predefined alarm operation, so as to execute the help seeking operation when the number of repeated executions of the user operation reaches a preset number of times.

In the above examples, the predefined rescue object may be a family member, a friend of the user or a police officer, which is not limited in the present disclosure. The distress information may include: location information, distress situation, audio information, video information, and picture information, which are not limited in the present disclosure. The distress situation may contain the information about the situation the user encounters and the help the user needs and other information.

Figure 9:
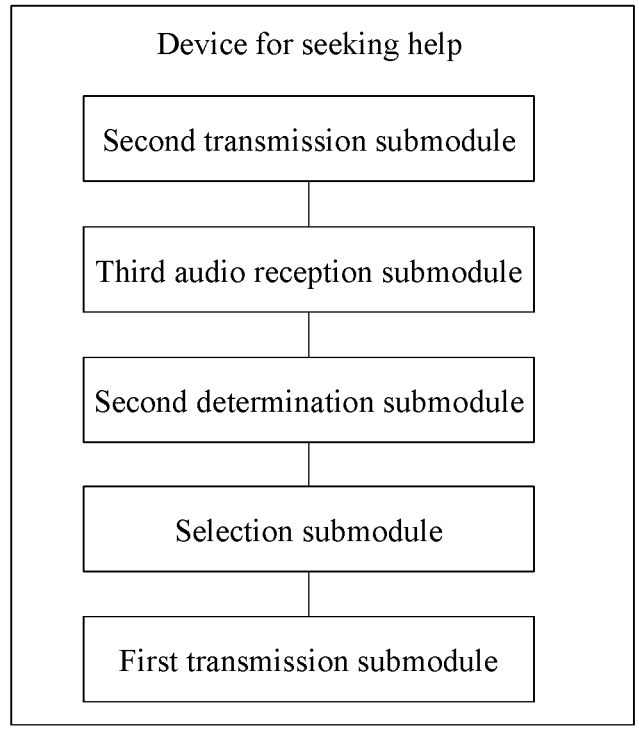
FIG. 9 is a structure diagram illustrating a device for seeking help according to another example.

In order to improve the degree of intelligence of the method for seeking help in the present disclosure, a device for seeking help is provided, wherein the help seeking operations are assisted by an electronic device associated with a smart footwear. The device for seeking help shown in FIG. 9 may include a second transmission submodule, a third audio reception submodule, a first determination submodule, a selection submodule, and a first transmission submodule. The second transmission submodule is configured to transmit an audio acquisition request to the electronic device associated with the smart footwear; and the third audio reception submodule is configured to receive the audio returned by the electronic device. When the audio is acquired by the electronic device associated with the smart footwear, the audio is acquired by a second audio reception submodule in the electronic device, which can simplify the structure of the help seeking device in the smart footwear, increase product stability and reduce costs. In this example, the functions of the first determination submodule, the selection submodule, and the first transmission submodule are the same as those in the example shown in FIG. 8, which will not be repeated herein.

In the above example, the device for seeking help may further include the first audio reception submodule and the first transmission submodule in the example shown in FIG. 8, and the operations of steps 302-305 may be performed if there is no electronic device associated with the smart footwear.

Figure 10:
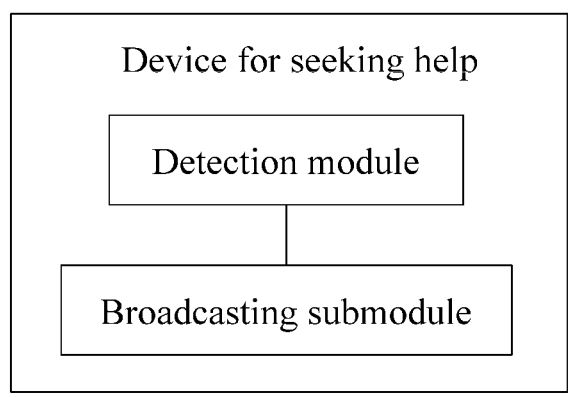
FIG. 10 is a structure diagram illustrating a device for seeking help according to another example.

In order to shorten the rescue time and improve the rescue efficiency, the present disclosure further provides a device for seeking help, as shown in FIG. 10, the device for seeking help may include a detection module and a broadcasting submodule, and the broadcasting submodule is configured to transmit a near field message to vicinity of the smart footwear; wherein the predefined rescue object comprises devices in the vicinity of the smart footwear. In this case, due to the predefined rescue object in the vicinity of the user, the time for rescue arrival can be reduced and user's safety can be enhanced.

Figure 11:
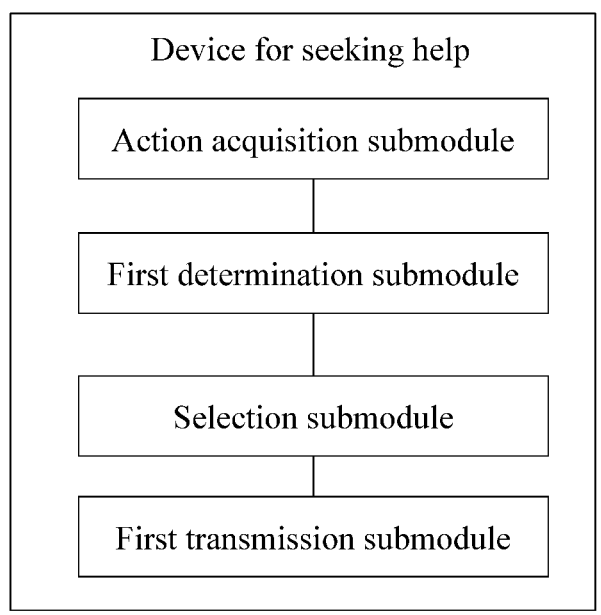
FIG. 11 is a structure diagram illustrating a device for seeking help according to another example.

FIG. 11 is a block diagram of a device for seeking help according to an example of the present disclosure. As shown in FIG. 11, the device for seeking help may include an action acquisition submodule, a first determination submodule, a selection submodule, and a first transmission submodule. The action acquisition submodule may include a space gesture information acquisition submodule configured to acquire the space gesture information of the smart footwear. Alternatively, the action acquisition submodule may include a pressure information acquisition submodule configured to acquire the pressure information of the smart footwear. The space attitude information may include a planar path and a space attitude change drawn for the smart footwear, which is not limited in the present disclosure. The pressure information may include the pressure values on the smart footwear or the number of sudden changes in the pressure values, which is not limited in the present disclosure.

The smart footwear may contain multiple predefined alarm operations for use by the user in different situations. The first determination submodule is configured to determine whether the action detected by the action acquisition submodule matches with at least one predefined alarm action. The action is ignored when it does not match with a predefined alarm action, and the function of the selection submodule is performed when the action detected by the action acquisition submodule matches with at least one predefined alarm action.

The selection submodule is configured to select a help seeking operation corresponding to the predefined alarm action that matches the action.

The first transmission submodule is configured to execute the selected help seeking operation. Specifically, in an example, the first transmission submodule is configured to issue an alarm, and transmit the distress information to a predefined rescue object. In another example, the first transmission submodule is configured to send an alarm signal to an associated electronic device, so that the electronic device can issue an alarm or transmit the distress information to a predefined rescue object.

In order to avoid the rescue object misunderstanding or ignoring the distress information, the device for seeking help may include a second determination submodule, to determine that the predefined rescue object receives the distress information successfully when the first transmission submodule continuously transmits the distress information. In another example, in order to prevent the smart footwear from transmitting a wrong distress information due to a wrong determination, the device for seeking help may include a counter submodule to count the number of repeated executions of the user action when the user action matches with the predefined alarm action, so as to execute the help seeking operation when the number of repeated executions of the user action reaches a preset number of times.

In the above examples, the predefined rescue object may be devices in the vicinity of the smart footwear, a family member, a friend of the user or a police officer, which is not limited in the present disclosure. When the predefined rescue object is the devices in the vicinity of the smart footwear, the execution module may include a broadcasting submodule to transmit a near field message to the vicinity of the smart footwear via Bluetooth, ZigBee or the like. In this case, due to the predefined rescue object in the vicinity of the user, the time for rescue arrival can be reduced and user's safety can be enhanced. The distress information may include: location information, distress situation, audio information, video information, and picture information, which are not limited in the present disclosure. The distress situation may contain the information about the situation the user encounters and the help the user needs and other information.

The present disclosure further provides a smart footwear according to the above examples, and the smart footwear may include a processor configured to implement the method for seeking help described above.

In an example, the disclosure further provides a non-transitory computer-readable storage medium comprising instructions, for example, a memory that includes instructions, the instructions when executed by a processor of a device for seeking help, cause the device to implement the method for seeking help described above in the present disclosure. The non-transitory computer-readable storage medium may be a ROM, a random access memory (RAM), a CD-ROM, a magnetic tape, a floppy disk, an optical data storage, or the like.

A method and a device for seeking help applied in a smart footwear are provided by the present disclosure to implement a help seeking operation in a hidden way.

According to a first aspect of the present disclosure, a method for seeking help is provided, the method is applied in a smart footwear and comprises: detecting a user operation with respect to the smart footwear; executing a help seeking operation when the user operation matches with a predefined alarm operation.

Alternatively, the detecting the user operation with respect to the smart footwear comprises: receiving an audio towards the smart footwear; and determining, when the audio matches with a predefined alarm audio, that the user operation matches with the predefined alarm operation.

Alternatively, the receiving the audio towards the smart footwear comprises at least one of: acquiring the audio by a first audio reception submodule in the smart footwear; transmitting an audio acquisition request to an electronic device associated with the smart footwear such that the electronic device acquires the audio by a second audio reception submodule in the electronic device.

Alternatively, the detecting the user operation with respect to the smart footwear comprises: detecting an action on the smart footwear; and determining, when the action matches with a predefined alarm action, that the user operation matches with the predefined alarm operation.

Alternatively, the detecting the action on the smart footwear comprises at least one of: acquiring space attitude information of the smart footwear, the space attitude information describing the action; and acquiring pressure information of the smart footwear, the pressure information describing the action.

Alternatively, the executing the help seeking operation when the user operation matches with the predefined alarm operation comprises: executing the help seeking operation when the user operation matches with the predefined alarm operation and the number of repeated executions of the user operation reaches a preset number of times.

Alternatively, the executing the help seeking operation when the user operation matches with the predefined alarm operation comprises: determining the predefined alarm operation that matches with the user operation; and selecting the help seeking operation corresponding to the predefined alarm operation that matches with the user operation, and executing the selected help seeking operation.

Alternatively, the executing the help seeking operation comprises at least one of: issuing an alarm or transmitting distress information to a predefined rescue object by an electronic device associated with the smart footwear; and issuing an alarm or transmitting distress information to a predefined rescue object by the smart footwear.

Alternatively, the transmitting the distress information to the predefined rescue object comprises: transmitting a near field message to vicinity of the smart footwear, wherein the predefined rescue object comprises devices in the vicinity of the smart footwear.

Alternatively, the transmitting the distress information to the predefined rescue object comprises: transmitting the distress information continuously until it is determined that the predefined rescue object receives the distress information successfully.

Alternatively, the distress information comprises at least one of: location information, distress situation, audio information, video information and picture information.

According to a second aspect of the present disclosure, a device for seeking help is provided, the device is applied in a smart footwear and comprises: a detection module configured to detect a user operation with respect to the smart footwear; an execution module configured to execute a help seeking operation when the user operation matches with a predefined alarm operation.

Alternatively, the detection module comprises: an audio reception submodule configured to receive audio towards the smart footwear, wherein the user operation is determined to match with the predefined alarm operation when the audio matches with a predefined alarm audio.

Alternatively, the audio reception submodule comprises: a first audio reception submodule configured to receive audio towards the smart footwear; and/or a second transmission submodule and a third audio reception submodule, wherein the second transmission submodule is configured to transmit an audio acquisition request to an electronic device associated with the smart footwear, and the third audio reception submodule is configured to receive the audio returned by the electronic device.

Alternatively, the detection module comprises: an action acquisition submodule configured to detect an action on the smart footwear, wherein the user operation is determined to match with the predefined alarm operation when the action matches with a predefined alarm action.

Alternatively, the action acquisition submodule comprises: a space attitude information acquisition submodule, configured to acquire space attitude information of the smart footwear, the space attitude information describing the action; and/or a pressure information acquisition submodule, configured to acquire pressure information of the smart footwear, the pressure information describing the action.

Alternatively, the execution module comprises: a counter submodule configured to count the number of repeated executions of the user operation when the user operation matches with the predefined alarm operation, so as to execute the help seeking operation when the number of repeated executions of the user operation reaches a preset number of times.

Alternatively, the execution module comprises: a first determination submodule configured to determine the predefined alarm operation that matches with the user operation; a selection submodule configured to select the help seeking operation corresponding to the predefined alarm operation that matches with the user operation, and executing the selected help seeking operation.

Alternatively, the execution module comprises: a first issuing submodule configured to issue an alarm or transmit distress information to a predefined rescue object by the smart footwear or an electronic device associated with the smart footwear.

Alternatively, the execution module further comprises: a broadcasting submodule configured to transmit a near field message to vicinity of the smart footwear, wherein the predefined rescue object comprises devices in the vicinity of the smart footwear.

Alternatively, the execution module further comprises: a second determination submodule configured to determine that the predefined rescue object receives the distress information successfully when the first transmission submodule continuously transmits the distress information.

Alternatively, the distress information comprises at least one of: location information, distress situation, audio information, video information and picture information.

According to a third aspect of the present disclosure, a smart footwear is provided, the smart footwear comprises a processor configured to implement the method for seeking help described above.

According to a fourth aspect of the present disclosure, a computer-readable storage medium is provided, the computer-readable storage medium has stored thereon computer instructions that, when executed by a processor, cause the processor to implement steps of the method described above.

Examples of the present disclosure may provide at least some of the following beneficial effects.

As can be seen from the examples described above, the present disclosure provides a method for seeking help with respect to a smart footwear. By detecting a user operation with respect to the smart footwear, and executing a help seeking operation when the user operation matches with a predefined alarm operation, the help seeking operation may be performed via the smart footwear in a fast and secret way, which may improve the user's safety and security.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. The specification and examples are merely considered to be exemplary.

It should be understood that the disclosure is not limited to the precise structure as described above and shown in the figures, but can have various modification and alternations without departing from the scope of the disclosure.

What is claimed is:

1. A method for executing a corresponding help seeking operation, which is applied in a smart footwear, the method comprising:
   detecting, by a detection module of the smart footwear, an operation of a user with respect to the smart footwear;
   counting, by the detection module, a number of repeated execution of the user operation that matches a predefined alarm operation to start the corresponding help seeking operation;
   determining, by the smart footwear, there is an electronic device associated with the smart footwear within a predetermined distance;
   sending, by a transmission submodule of the detection module, an audio acquisition request to the electronic device associated with the smart footwear in response to said determining;
   receiving, by a reception submodule of the detection module, an audio returned from the electronic device in response to the audio acquisition request, wherein the audio is an audio acquired from the user of the smart footwear by an audio reception circuit in the electronic device; and
   executing, by an execution module of the smart footwear, the corresponding help seeking operation based on the audio acquired from the user and when the audio returned from the electronic device matches a predefined alarm audio using the smart footwear;
   wherein the executing the corresponding help seeking operation comprises transmitting distress information to a predefined rescue object of the corresponding help seeking operation, the distress information comprising location information and audio information.

2. The method of claim 1, wherein the detecting the user operation on the smart footwear further comprises at least one of:
   stamping foot;
   acquiring space attitude information of the smart footwear, wherein the space attitude information describes an action of the user on the smart footwear; and
   acquiring pressure information of the smart footwear, wherein the pressure information describes an action of the user on the smart footwear.

3. The method of claim 1, wherein the executing the corresponding help seeking operation further comprises:
   issuing an alarm by using the electronic device associated with the smart footwear.

4. The method of claim 3, wherein the transmitting the distress information to the predefined rescue object comprises:
   transmitting a near field message to a vicinity of the smart footwear, wherein the predefined rescue object comprises devices in the vicinity of the smart footwear.

5. A device for executing a corresponding help seeking operation, which is applied in a smart footwear, comprising:
   a processor; and
   a memory configured to store instructions executable by the processor, wherein the processor is configured to:
   detect an operator of a user with respect to the smart footwear;
   count a number of repeated execution of the user operation that matches a predefined alarm operation to start the corresponding help seeking operation;
   determine there is an electronic device associated with the smart footwear within a predetermined distance;
   send an audio acquisition request to the electronic device associated with the smart footwear in response to said determine;
   receive an audio returned from the electronic device in response to the audio acquisition request, wherein the audio is an audio acquired from the user of the smart footwear by an audio reception circuit in the electronic device; and
   execute the corresponding help seeking operation based on the audio acquired from the user and when the audio returned from the electronic device matches a predefined alarm audio using the smart footwear;
   wherein said execute the corresponding help seeking operation comprises transmitting distress information to a predefined rescue object of the corresponding help seeking operation, the distress information comprising location information and audio information.

6. The device of claim 5, wherein the processor is configured to detect the user operation further comprising:
   detecting foot stamping of the user on the smart footwear;
   acquiring space attitude information of the smart footwear, wherein the space attitude information describes an action of the user on the smart footwear; and/or
   acquiring pressure information of the smart footwear, wherein the pressure information describes an action of the user on the smart footwear.

7. The device of claim 5, wherein the processor is further configured to execute the corresponding the help seeking operation to
   issue an alarm by using the electronic device associated with the smart footwear.

8. The device of claim 7, wherein the processor is further configured to execute the corresponding the help seeking operation to
   transmit a near field message to a vicinity of the smart footwear, wherein the predefined rescue object comprises devices in the vicinity of the smart footwear.

9. A non-transitory computer-readable storage medium having stored thereon computer instructions that, when executed by a processor of a smart footwear, cause the processor to execute a corresponding help operation to implement:
   detecting an operator of a user with respect to the smart footwear;
   counting a number of repeated execution of the user operation that matches a predefined alarm operation to start the corresponding help seeking operation;
   determining there is an electronic device associated with the smart footwear within a predetermined distance;
   sending an audio acquisition request to the electronic device associated with the smart footwear in response to said determining;
   receiving an audio returned from the electronic device in response to the audio acquisition request, wherein the audio is an audio acquired from the user of the smart footwear by an audio reception circuit in the electronic device; and
   executing the corresponding help seeking operation based on the audio acquired from the user and when the audio returned from the electronic device matches a predefined alarm audio using the smart footwear;
   wherein said executing the corresponding help seeking operation comprises transmitting distress information to a predefined rescue object of the corresponding help seeking operation, the distress information comprising location information and audio information.

10. The non-transitory computer-readable storage medium of claim 9, wherein the computer instructions further cause the processor to implement:
   issuing an alarm by using the electronic device associated with the smart footwear.

\* \* \* \* \*